(12) United States Patent
Pietromonaco

(10) Patent No.: US 9,692,284 B2
(45) Date of Patent: *Jun. 27, 2017

(54) ELECTRIC MOTOR WITH PLURAL STATOR COMPONENTS

(71) Applicant: ARM Limited, Cambridge (GB)

(72) Inventor: David Pietromonaco, San Jose, CA (US)

(73) Assignee: ARM Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/939,316

(22) Filed: Nov. 12, 2015

(65) Prior Publication Data

US 2016/0065041 A1    Mar. 3, 2016

Related U.S. Application Data

(63) Continuation of application No. 14/105,201, filed on Dec. 13, 2013, now Pat. No. 9,214,837.

(51) Int. Cl.
*H02P 25/08* (2016.01)
*H02K 16/04* (2006.01)
(Continued)

(52) U.S. Cl.
CPC .......... *H02K 16/04* (2013.01); *H02K 1/185* (2013.01); *H02K 3/28* (2013.01); *H02K 19/103* (2013.01); *H02P 25/08* (2013.01); *H02K 2201/06* (2013.01)

(58) Field of Classification Search
CPC .......... H02K 3/28; H02K 37/14; H02K 16/04; H02K 1/185
See application file for complete search history.

(56) References Cited

U.S. PATENT DOCUMENTS

| 3,809,990 A | 5/1974 | Kuo et al. |
| 5,744,896 A | 4/1998 | Kessinger, Jr. et al. |

(Continued)

FOREIGN PATENT DOCUMENTS

| CN | 102983694 | 3/2013 |
| JP | 57-180362 | 11/1982 |

(Continued)

OTHER PUBLICATIONS

U.S. Appl. No. 14/105,201, filed Dec. 13, 2013, Pietromonaco.

(Continued)

*Primary Examiner* — Karen Masih
(74) *Attorney, Agent, or Firm* — Nixon & Vanderhye P.C.

(57) ABSTRACT

An electric motor apparatus comprises a rotor and a stator formed of at least two stator components, each of the at least two stator components having a substantially hollow cylindrical form. The rotor is mounted within the at least two stator components on a rotational mounting such that the rotor can rotate about a longitudinal central axis with respect to the stator. Each of the at least two stator components has at least two protrusions arranged at different circumferential points on an inner surface of the at least two stator components. Each protrusion has a winding mounted thereon. Control circuitry generates control signals to control power supplied to the windings on each stator component such that power can be controlled to each stator component independently. The stator components are mounted adjacent to each other along the longitudinal central axis and rotationally offset with respect to each other such that the two protrusions on one of the stator components are offset with respect to the protrusions on an adjacently mounted stator component, such that a portion of each winding that extends beyond a longitudinal end of the protrusions on one of the (Continued)

stator components fits within a gap between windings mounted on the adjacently mounted stator component.

10 Claims, 5 Drawing Sheets

(51) Int. Cl.
 *H02K 1/18* (2006.01)
 *H02K 19/10* (2006.01)
 *H02K 3/28* (2006.01)

(56) References Cited

U.S. PATENT DOCUMENTS

| | | |
|---|---|---|
| 5,982,069 A | 11/1999 | Rao |
| 8,482,181 B2 | 7/2013 | Murray, III |
| 2003/0159271 A1 | 8/2003 | Wang |
| 2004/0217665 A1 | 11/2004 | Hans |
| 2010/0187943 A1 | 7/2010 | Heim |
| 2012/0038228 A1 | 2/2012 | Vollmer |
| 2012/0098376 A1 | 4/2012 | Ombach |
| 2012/0169174 A1 | 7/2012 | Radov et al. |
| 2016/0164386 A1* | 6/2016 | Kusase .............. H02K 1/276 310/156.01 |

FOREIGN PATENT DOCUMENTS

| | | |
|---|---|---|
| JP | 61-126223 | 8/1986 |
| JP | 2010-148170 | 7/2010 |

OTHER PUBLICATIONS

International Search Report and the Written Opinion of the International Searching Authority mailed Jul. 8, 2015 in PCT/GB2014/053194, 12 pages.

* cited by examiner

ELECTRIC MOTOR WITH PLURAL STATOR COMPONENTS

CROSS-REFERENCE

This application is a continuation of U.S. application Ser. No. 14/105,201 filed Dec. 13, 2013, the entire contents of which are incorporated herein by reference in this application.

TECHNICAL FIELD

The technical field relates to electric motors.

BACKGROUND

There are several different ways of configuring electric motors each of which has its own associated advantages and disadvantages. Many of these configurations provide very efficient operations. However, this high efficiency is generally restricted to a particular optimum operating frequency of the motor and when the motor moves away from this operating frequency the efficiency may drop dramatically. In order to address this problem, motors of the prior art have been operated in conjunction with gearing systems, such that they can drive axles at different speeds, while still operating close to their own optimum rotation frequency. The provision of gears adds cost to the system and can themselves reduce efficiency.

It would be desirable to be able to increase the range of efficient operation of an electric motor.

SUMMARY

Viewed from a first aspect the present invention provides an electric motor apparatus comprising:
a rotor; and
a stator formed of at least two stator components, each of said at least two stator components having a substantially hollow cylindrical form;
said rotor being mounted within said at least two stator components on a rotational mounting such that said rotor can rotate about a longitudinal central axis with respect to said stator;
each of said at least two stator components comprising at least two protrusions arranged at different circumferential points on an inner surface of said at least two stator components, each of said at least two protrusions having a winding mounted thereon; and
control circuitry configured to generate control signals to control power supplied to said windings on each of said at least two stator components, such that power can be controlled to each of said at least two stator components independently of each other; wherein
said at least two stator components are mounted adjacent to each other along said longitudinal central axis and rotationally offset with respect to each other, such that said at least two protrusions on one of said at least two stator components are offset with respect to said at least two protrusions on an adjacently mounted one of said at least two stator components, such that a portion of each of said windings that extends beyond a longitudinal end of said protrusions on one of said at least two stator components fits within a gap between windings mounted on said adjacently mounted stator component.

The technology described herein recognises that the efficiency of an electric motor falls dramatically when the motor operates away from its optimum frequency. Reducing the power supplied to the motor reduces its operating frequency but also generally reduces its efficiency. In this regard in an electric motor where there are windings that generate an electric field, the motor operates most efficiently if the magnetic field generated within the body that the windings are mounted on is saturated. Supplying a lower current to the windings reduces the magnetic field such that it is no longer a saturated filed and thus, although the rotational speed will drop so also will the efficiency of operation of the motor.

The present invention splits the stator of the motor longitudinally into individual components such that the windings do not extend along the full axial length of the stator, only along the length of one of the stator components. In this way driving the windings on only one of the stator components will reduce the power supplied to the motor and thus, the frequency of operation, but will still provide a saturated magnetic field in that part of the stator. However, a problem with such an arrangement is that dividing the windings into several windings in this manner provides windings that are not as efficient as a single winding would be, as with windings, the portion of the winding that extends beyond the end of the protrusion on which it is mounted does not contribute much to the magnetic field induced in the protrusion. Dividing the winding into several windings generates more of these end portions. Furthermore, these end portions which extend beyond the end of the protrusions make the mounting of the adjacent stator awkward. In this regard, when wires are wound around a protrusion, how closely a wire can follow the contour of the protrusion is limited by the flexibility of the wire and the angles of the protrusion. The lateral ends of the protrusion are quite narrow and, thus the wire needs to travel around two steep angles, which means that the wires do not follow the contours very closely but rather extend out from the protrusions by an amount that is significant enough to affect the compactness of the motor and the efficiency of the magnetic field generation.

The present technique has mitigated this problem by arranging the stators at an offset angle to each other such that the windings extending out of one stator component fit into the gaps between the windings sticking out of the adjacent stator components. In this way the end of the windings that extend beyond one stator component may be at least partially alongside a protrusion in the other stator component. This allows it to contribute to the magnetic field generated in this protrusion and also it allows the two stator components to be mounted close to each other. Thus, the motor can be operated efficiently at fractions of the usual power or rotation frequency at a high efficiency, while not becoming unduly long.

This offset can also in some motor designs reduce torque fluctuations that occur when certain parts of the rotor align with the windings on the stator. In this regard the kick provided in the torque when the active part of the rotor aligns with an active part of the stator may be reduced by the windings on the stator being located at different circumferential positions at different points along its length, making the generation of the torque smoother.

Although each stator component may have two or more protrusions in some embodiments each of said at least two stator components comprise at least twelve protrusions, each comprising a winding.

Providing substantially more than two windings on each of the stator components is a further way of reducing torque fluctuations that arise when the active part of the rotor align with the stator windings. The more stator windings there are then the lower the field produced by each is, and the corresponding kick provided by each winding to the rotor on alignment is similarly reduced. Thus, the provision of multiple windings in conjunction with an offset in the windings along the length of the stator can result in reductions in torque ripples.

In some embodiments said rotor comprises a single rotor component.

Although it may be advantageous to provide separate stator components, it may be advantageous for the rotor to be formed of a single component which is mounted within the multiple stator components and driven by them, the speed and power of the motor depending on the number of stator components that have windings that are powered.

In some embodiments, said rotor comprises a plurality of protrusions extending out of said outer surface, said plurality of protrusions being formed of a magnetic material.

Although the rotor may be formed in a number of different ways provided that it has magnetically active portions that, when close to the windings of the stator, exert a force on the rotor, a rotor having protrusions that are formed of a magnetic material such as iron or steel, provide a suitable rotor for a switched reluctance motor that can be driven by appropriate control of the power supplied to the windings of the stator.

In the case of a switched reluctance motor, in some embodiments a number of said plurality of protrusions is different to a number of said protrusions on each of said at least two stator components.

Where the motor is a switched reluctance motor, although the rotor and stator may have any number of protrusions it may be advantageous if the number of protrusions on the rotor is different to that on the stator such that they are never all exactly aligned. Once again this will reduce torque fluctuations.

In some embodiments, said plurality of protrusions run parallel to a longitudinal axis of said rotor.

In some embodiments, the protrusions are mounted without an offset such that they run parallel along the longitudinal axis of the rotor. Generally when making electric motors there is a prejudice to provide the protrusions at an offset to the longitudinal axis such that one protrusion is not exactly aligned with a single winding on the stator at any one time. In this way the torque fluctuations are reduced. However, in some embodiments of the invention it has been found that the motor will run with reduced torque fluctuations due to other features such as an increased number of windings and some of the windings on the rotor and stator being offset with respect to each other. In such cases it may be that the provision of protrusions that run parallel to the longitudinal axis is acceptable and in this way a rotor that is cheaper to manufacture yet provides an acceptable level of torque fluctuations can be produced.

In some embodiments, said control circuitry is configured to independently control said power supplied to each of said windings on each of said at least two stator components in order to control torque output generated by said motor.

Advantageous control over the torque output generated by the motor can be provided by enabling independent control of the power supplied to each of the windings on the different stator components. Such a technique is particularly useful when used in conjunction with the straight protrusions as the control can be used to compensate for the lack of offset in these protrusions and in effect vary the power supplied to the windings as the rotor protrusions approach and move away from each of them. In this regard, there has been a technical prejudice against providing individual control signals to control the power supplied to each of the different windings, particularly where there are more than three windings that need individual control, as generally power supplies will not have more than three phases and thus, providing this additional control is complex. However, it has been recognised that with the present technique that provides many windings and thus, a reduction in current required in each, then such control may indeed be possible, as the control components required with the lower current are significantly cheaper than those that are required for higher currents. In this way the performance of the motor can be improved particularly where rotors with straight protrusions are used.

In some embodiments, said control circuitry is configured to control said power supplied to said windings on each of said at least two stator components such that said power supplied to said windings on one of said at least two stator components is controlled independently to said power supplied to windings on said adjacently mounted stator component, and said power supplied to each winding on each of said at least two stator components is controlled independently compared to an adjacent winding.

In some cases, rather than providing independent control to each winding, the independent control may be limited to windings that are not adjacent to each other and to windings on different stator components. In this way, the number of different control signals is reduced while still providing effective control to reduce torque fluctuations.

In some embodiments, said control circuitry comprises rotational position detection circuitry for detecting a current position of said rotor relative to each of said at least two stator components, said control circuitry being configured to control said power supplied to said windings in dependence upon said detected current position.

Where there is independent control to at least some of the windings then a rotational positional detector may be used to determine where the rotor is with respect to the stator and thereby provide the appropriate control.

In some embodiments the rotor comprises a plurality of components each providing a magnetic path, said plurality of components running parallel to said longitudinal axis. These components may take a number of different forms, possibly depending on the particular type of motor apparatus. For example, in a "wound rotor" type motor these components may be provided by the windings on the rotor running parallel to its longitudinal axis. Alternatively where a "squirrel cage" type rotor is provided, these components may be provided by the electrically conductive bars which form the squirrel cage. Alternatively where a switched reluctance type motor is provided, these components may be provided by structures which enable the electromagnetic response of the rotor, such as bars of electromagnetically responsive material. It should also be recognised that the magnetic paths may not necessarily coincide with the components, for example where the arrangement of the components is in the form of fins running along the rotor, where the magnetic paths may be viewed as running along the grooves defined between the fins.

In some embodiments said plurality of components are each configured to provide a single magnetic path running substantially the whole length of said rotor along said longitudinal axis. As such, each component (say a winding, bar or structure as in the examples mentioned above) may for example itself run substantially the whole length of the rotor (allowing for perhaps some mountings at either end).

In some embodiments a number of said plurality of components is equal to a number of said plurality of protrusions on said stator. Given that there are at least two stator components mounted adjacent to each other along said longitudinal central axis and rotationally offset with respect to each other, this then means that (where these embodiments of the rotor have a single rotor structure along the length of the rotor) there are then effectively twice as many stator positions as rotor positions (in terms of rotational symmetry), giving more precision in the control that can be asserted over the rotor by the stator.

The present technique is also applicable to inductance motors where the rotor has inserts of a highly electrically conductive material in which a current is induced when moved within an electric and corresponding magnetic field. These motors tend to be self-aligning. As in inductance motors the rotor tends to be self aligning with the stator then where the number of components is equal to the number of protrusions, offsetting the stator windings with respect to the different stator components will only provide an efficient motor where the rotor is itself formed in two components with the inserts being similarly offset with respect to each other. This allows the inserts to be provided in a manner where they run parallel to the longitudinal axis and thus, are easier to manufacture than those that are offset while still providing the reduction in torque fluctuations by being offset along their length. In this regard, this will only provide a reduction in torque fluctuations where the motor is run at full power and both stator components are powered. Where only one stator component is powered then there will be not be this advantage of the offset along the length of the motor. However, as these motors are generally designed with many windings and inserts this in itself provides a reduction in torque fluctuations.

In some embodiments the rotor comprises at least two rotor components each mounted within a corresponding one of said at least two stator components, wherein said plurality of components on each of said at least two rotor components are each configured to provide a single magnetic path running substantially half of the length of said rotor along said longitudinal axis. Accordingly the components may be formed split into two halves along the length of the rotor.

In some embodiments said plurality of components on each of said at least two rotor components are offset with respect to each other to a same degree as said protrusions on said at least two stator components are offset with respect to each other. Accordingly the components may be formed in two halves both split along the length of the rotor and wherein the two halves are also offset (rotationally with respect to the longitudinal axis) with respect to one another. Offsetting the two halves with respect to one another provides further as possible rotor positions (in terms of rotational symmetry), giving more precision in the control that can be asserted over the rotor by the stator.

A second aspect of the present invention provides method of operating an electric motor apparatus, said electric motor apparatus comprising: a rotor; and a stator formed of at least two stator components, each of said at least two stator components having a substantially hollow cylindrical form; said rotor being mounted within said at least two stator components on a rotational mounting such that said rotor can rotate about a longitudinal central axis with respect to said stator; each of said at least two stator components comprising at least two protrusions arranged at different circumferential points on an inner surface of said at least two stator components, each of said at least two protrusions having a winding mounted thereon; and control circuitry to control power supplied to windings on each of said at least two stator components; said method comprising:

supplying power to windings on one of said at least two stator components in response to a request for a low rotational frequency; and supplying power to windings on more than one of said at least two stator components in response to a request for an increased rotational frequency.

A third aspect of the present invention provides an electric motor apparatus comprising:

a rotor; and a stator formed of at least two stator components, each of said at least two stator components having a substantially hollow cylindrical form;

said rotor being mounted within said at least two stator components on a rotational mounting such that said rotor can rotate about a longitudinal central axis with respect to said stator;

each of said at least two stator components comprising at least two protrusions arranged at different circumferential points on an inner surface of said at least two stator components, each of said at least two protrusions having a winding mounted thereon; and control means for generating control signals to control power supplied to said windings on each of said at least two stator components, such that power can be controlled to each of said at least two stator components independently of each other; wherein said at least two stator components are mounted adjacent to each other along said longitudinal central axis and rotationally offset with respect to each other, such that said at least two protrusions on one of said at least two stator components are offset with respect to said at least two protrusions on an adjacently mounted one of said at least two stator components, such that a portion of each of said windings that extends beyond a longitudinal end of said protrusions on one of said at least two stator components fits within a gap between windings mounted on said adjacently mounted stator component.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1A:
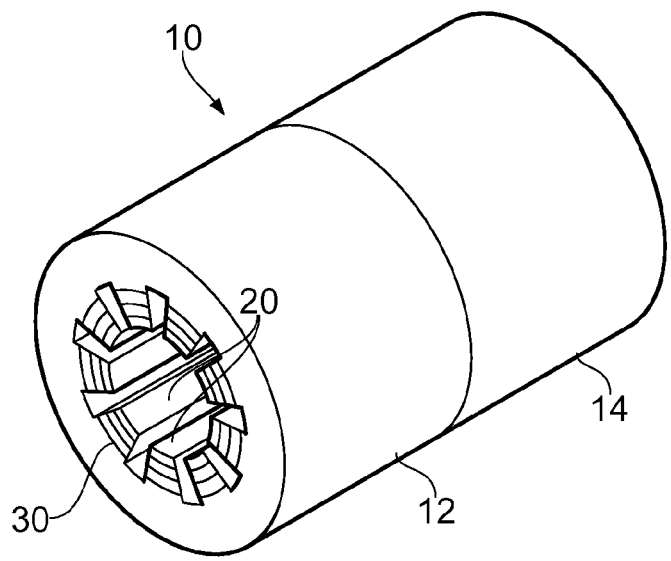
FIGS. 1A, 1B and 1C show a data component for an electric motor according to an embodiment of the present embodiment.

FIG. 1A shows a stator 10 formed of two components 12 and 14 mounted adjacent to each other. The end section of stator component 12 can be seen and it shows a plurality of protrusions or teeth 20 that extend from the inner circumferential surface of the stator and run along the longitudinal length of the stator. Each of the teeth supports a winding 30. The windings 30 are supplied with current and generate a magnetic field within each tooth. The amount of current supplied can be varied, however, where it is just sufficient to generate a saturated magnetic field in a tooth then this provides a particularly efficient motor.

Figure 1B:
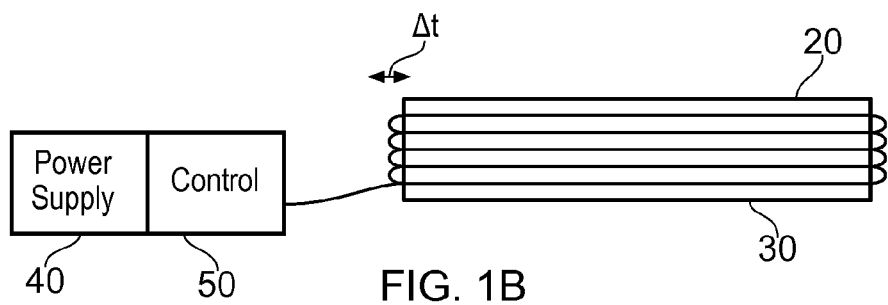

FIG. 1B shows how the windings 30 are mounted along the teeth 20 which run along the length of the stator component 12. There are corresponding teeth that run along the length of the stator component 14.

The windings 30 are wound around the teeth and at the end they extend beyond the end of the teeth by an amount $\Delta t$. As will be clear the flexibility of the wire will determine how close to the teeth 20 the winding 30 can be wound and in general, where the winding passes around the end of a tooth it will extend beyond it. These protrusions $\Delta t$ impede the mounting of an adjacent stator.

FIG. 1B also shows power supply circuitry 40 and control circuitry 50 which latter controls power supplied from the former to the windings 30 on the stator component 12. In this regard, the control circuitry 50 may control the power supply to all of the windings such that all of the windings in a particular stator component receive the same power at the same time, or it may provide individual control of the power supplied to the different windings or it may group the windings together and individually control the power supplied to these groups of windings. In any case, the control circuitry 50 allows individual control of the power that is supplied to the windings on the different stator components 12 and 14 such that one of the stator components can be powered while the other is not. In this way, the amount of power supplied to the motor can in this embodiment be reduced by half while still providing a saturated magnetic field in the teeth of the stator component to which power is supplied, thereby allowing the motor to operate efficiently at half the usual power and therefore half the frequency.

Although, only two components are shown in this example, it should be clear to a skilled person that there could be more than two components, the increasing number of components allowing the motor to operate high efficiency at further power levels and rotational frequencies.

Figure 1C:
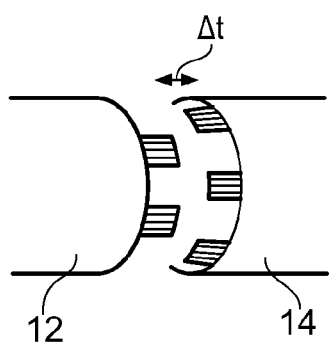

FIG. 1C shows how the problem of the windings 30 extending beyond the end of the teeth 20 by $\Delta t$ can be addressed to allow the stators to be mounted together in a compact and efficient way. Thus, in FIG. 1C the two stator components are rotationally offset with respect to each other such that the windings from one extend within the gaps between the windings on the other. This offset must be sufficient to allow the ends of the windings to overlap and thus, it may be that an appropriate offset is provided by rotating one of the stator components with respect to the others by half the distance between two adjacent windings. By offsetting the stator components in this way not only can the two stator components be mounted in a more compact fashion but the portion of the stator where there are coils which don't overlap with teeth is reduced. In this way the generation of the magnetic field is improved when compared with the case where the two stator components are not offset with respect to each other, so that an extension of one winding does not overlap with the teeth from another stator.

In the case that they can be mounted to fit exactly within each other the distance required between the two stator components is $\Delta t$ rather than at least $2\Delta t$ as would be the case if there was no offset.

Offsetting the coils in this way can produce its own problems which can be addressed in different ways.

In this regard, the fields generated by the two stator components do not line up if the windings are controlled to carry the same currents. This can be a problem particularly in switched reluctance motors and this can be addressed by providing individual control of the power supplied to the windings on the different stator components.

Although, this arrangement of the windings on the stator components may generate its own requirement for individual control, it can also be advantageous in that the flux along the stator is not at the same point in its cycle along the length of the stator and this can be used to reduce torque fluctuations in the motor as it spins the rotor.

As can be seen in FIG. 1A there are a number of protrusions or teeth 20 holding a number of windings 30. Although, embodiments of the present invention are applicable to stators 10 with two or more such teeth or protrusions 20, preferred embodiments have many more, for example, 12 such protrusions would provide a motor having low torque fluctuations. In this regard, the higher the number of protrusions and windings the lower the torque fluctuations that arise when the active part of the rotor is aligned with a particular winding. Furthermore, in order to produce a motor having a particular power output where there are only a few windings then a large current needs to be supplied to each of these windings to provide the required power. However, where there are more windings the required amount of current is split between the windings and thus, the actual current supplied to each winding is reduced. The force provided by each winding is similarly reduced and fluctuations in torque are also reduced. A drawback of such an arrangement is that it may require more complex power supply and indeed in some cases control, where the control for each of the windings is done individually. However, as there are lower current requirements for these windings then it may be that the control circuitry can be formed from switching components that are more readily available and cheaper making the additional control requirements cheaper and easier to implement. Such additional control can also improve the performance of the motor.

Figure 2:
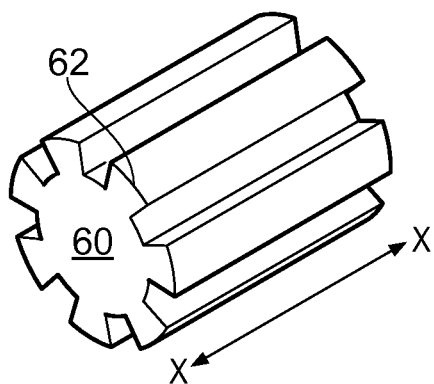
FIG. 2 shows a rotor for a switched reluctance motor according to an embodiment of the present embodiment.
Figure 3:
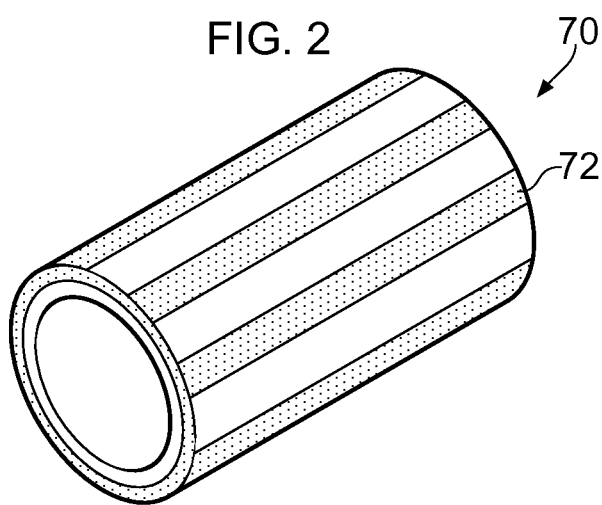
FIG. 3 shows a rotor for an inductance motor according to an embodiment of the present invention.
Figure 4:
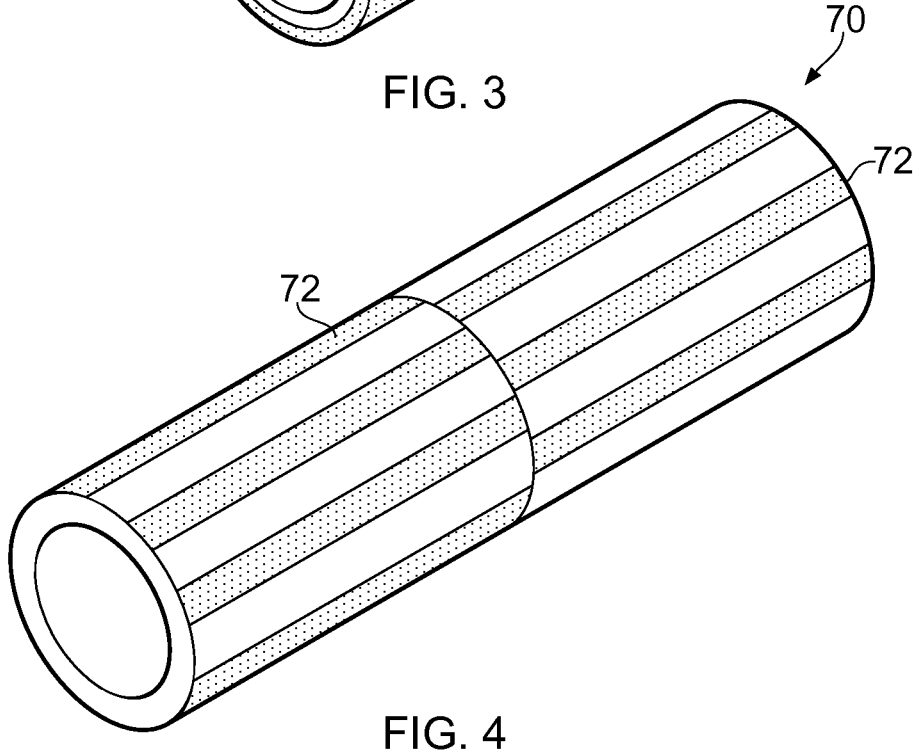
FIG. 4 shows a split rotor with two components according to an embodiment of the present invention.

FIGS. 2 to 4 show rotors that are suitable for mounting within the stator shown in FIG. 1. In this regard, FIG. 2 shows a rotor 60 which is formed of a magnetic material in this case silicone steel and which has protrusions 62 at different circumferential positions on the outer surface of the rotor. This rotor extends along the full length of the stator 10 within both of the stator components 12 and 14. The number of protrusions 62 it has are not equal to the number of teeth that hold windings in the stator of FIG. 1 such that when one of the teeth of the rotor is aligned with a winding in the stator the adjacent ones are not aligned.

As can be seen from this embodiment the protrusions 62 extend in a straight line that is parallel to the longitudinal axis xx of the rotor. This enables the rotor 60 to be more easily built than were the protrusions arranged at an offset to the longitudinal axis as is common in the prior art. Allowing the protrusions to run in a straight line does mean that they are aligned with some of the windings for a longer length of the stator which makes the generation of the torque less uniform. However, this is acceptable in a design where there are many protrusions and windings such that the force from each winding is reduced compared to a design with fewer windings and protrusions that generate the same resultant force.

Furthermore, where more than one stator component is powered up then the windings in the different stator components are offset with respect to each other along the stator length and this in itself reduces torque fluctuations. In such a case, the powering of the windings must be controlled so that the appropriate power is supplied at the appropriate time to drive the rotor in the required direction. This will be explained in greater detail with respect to FIG. 7.

FIG. 3 shows an alternative rotor 70 which can be mounted within the stator 10 of FIG. 1. This rotor is for use in an inductance type motor and comprises inserts 72 that are made of a highly conductive material. When the rotor 70 is mounted within the stator 10 current flowing in the windings generates an electric and magnetic field which induces a current within the insert 72, which in turn generates an electric and magnetic field which provides a force that acts on rotor 70 and causes it to rotate. In this embodiment, the number of inserts is designed to be equal to the number of teeth on the stator 10 and the device is self aligning. Rotor 70 may not rotate very efficiently within the stator 10 of FIG. 1 owing to the offset of the stator components when they are both powered.

A preferred form of the rotor 70 is shown in FIG. 4. In this embodiment the inserts 72 are offset which respect to each other at a point along the length of the rotor, in a way that corresponds to the way that the windings in the stator components 12 and 14 10 of FIG. 1A are offset with respect to each other. This allows the self aligning of the rotor to be consistent along the length of the stator component and leads to an efficient motor. Although, FIG. 4 and FIG. 1A both show two components for rotor and stator respectively it should be understood by a skilled person that there could be many more, with each component having an offset that allows the windings on one stator component to slot within the gaps between the winding on one or more adjacent stator components. The inserts on the rotor should be offset in a corresponding manner to allow them to match the offset of the windings of the stator.

Figure 5A:
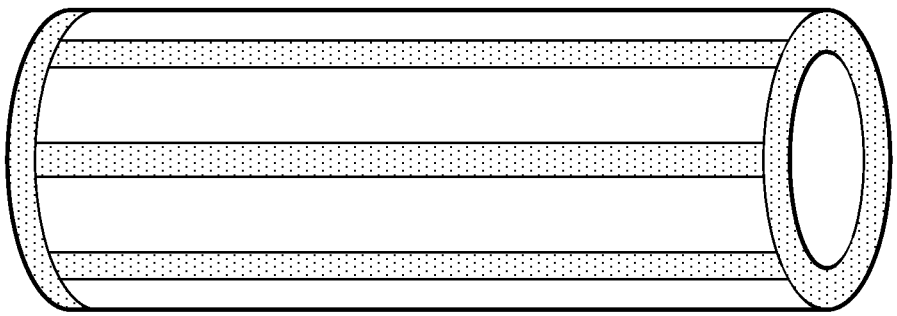
FIG. 5A-C show three different rotor configurations according to three different embodiments of the present invention.
Figure 5B:
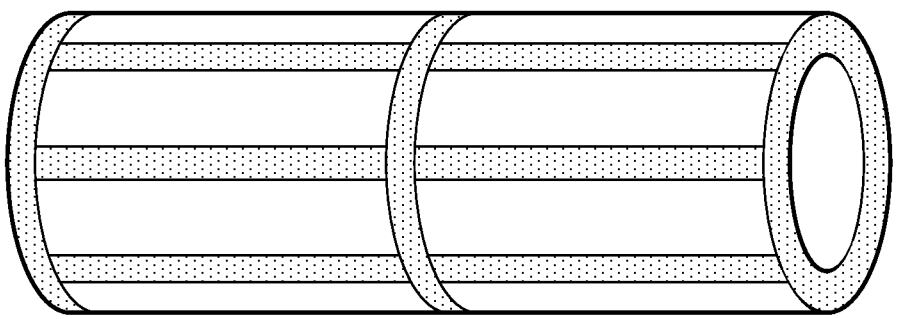
Figure 5C:
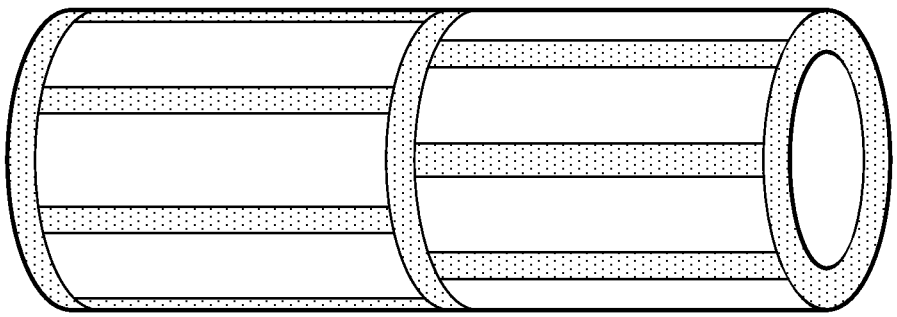

FIGS. 5A-5C schematically show three different rotor configurations according to three different embodiments. The longitudinal darker bars in each of FIGS. 5A-C represent components which each provide a electrical path, whilst the paler sections between the darker bars provide magnetic paths. The particular type of these components will vary depending on the particular type of motor apparatus. For example, where the motor has a "wound rotor" these components represent the windings on the rotor running parallel to its longitudinal axis. Alternatively where a "squirrel cage" type rotor is provided, these components represent the electrically conductive bars which form the squirrel cage. Alternatively where a switched reluctance type motor is provided, these components represent the structures which enable the electromagnetic response of the rotor, such as bars of electromagnetically responsive material.

In the example of FIG. 5A these components each run substantially the whole length of the rotor along its longitudinal axis (other than the mountings (darker shaded ring) at either end). The magnetic paths provided by these components thus also run substantially the whole length of the rotor along its longitudinal axis. The number of these components may be set to be equal to the number of protrusions on said stator. This style of rotor has a manufacturing simplicity and can also allow for torque ripple reduction due to the apparent doubling of the positions of the stator teeth that results in a configuration when the number of components matches the number of stator teeth (due to the rotational offset between the (at least) two stator components).

In the example of FIG. 5B there are shown to be two halves to the rotor and the components on each of the two halves provide a single magnetic path running substantially half of the length of said rotor along said longitudinal axis. The two halves are divided by another mountings (darker shaded ring) shown at the midpoint of the rotor). Like the FIG. 5A configuration this can also support torque ripple reduction, but the FIG. 5B configuration also allows entirely half the motor to be shut down completely. This saves magnetic core losses in half the rotor and stator cores when the motor is used in low power output situations.

In the example of FIG. 5C it can be seen that, like in FIG. 5B, there are two split halves to the rotor, but in addition these two halves are rotationally offset with respect to one another. Although this then does not support the torque ripple reduction effect possible with the FIGS. 5A and 5B configurations, like the FIG. 5B configuration this also allows entirely half the motor to be shut down completely. Moreover, this configuration can simplify the electronics since now the two halves of the motor look identical in electrical timing and so half as many calculations and control circuitry is necessary.

Figure 6:
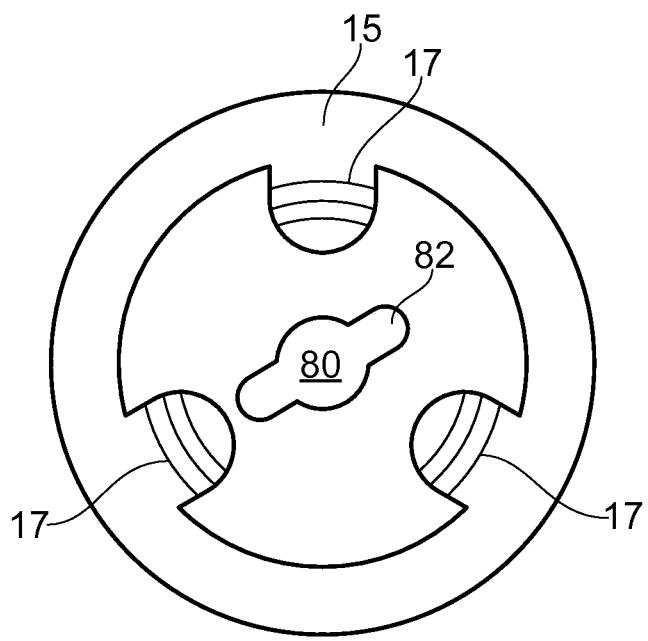
FIG. 6 schematically shows a rotor mounted within a stator of a switched reluctance motor according to an embodiment of the present invention.

FIG. 6 shows a cross section through a motor with a rotor 80 which is a rotor similar to that shown in FIG. 2 but with only two protrusions mounted within a stator 15. In this case the stator 15 has three teeth 17 each comprising windings and the rotor 80 has two teeth 82. As can be seen when one of the teeth 82 is aligned with one of the teeth 17 of the stator then the other tooth is directly between the other two protrusions. This means that the force generated from the winding is at a maximum on one of the teeth of the rotor and a minimum on the other. Such an arrangement allows the torque supplied to the rotor to be fairly constant as the rotor 80 revolves. Clearly in many embodiments there will be many more teeth on both the stator and the rotor which will lead to even fewer fluctuations in torque.

Figure 7:
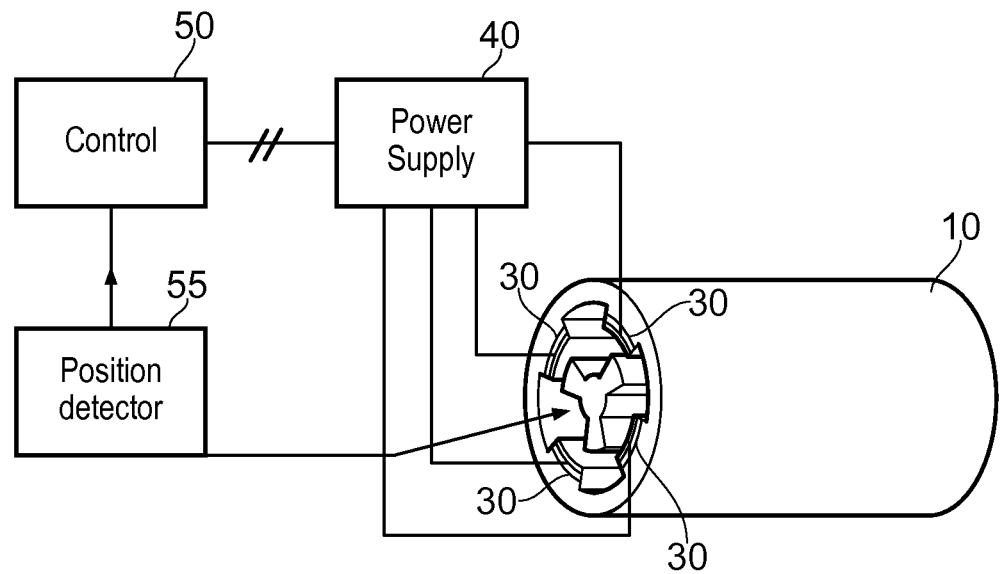
FIG. 7 schematically shows the control of power supplied to windings on a stator of an electric motor according to an embodiment of the present invention.

FIG. 7 shows a control system for a switched reluctance motor such as that shown in FIG. 6 but with more teeth on both the rotor and the stator. In this embodiment, the windings 30 on stator 10 are powered individually by a power supply 40 which has a multi-bit control signal sent from control circuitry 50. There is also a position detector 55 which determines a current position of a rotor. This may be done optically using a mark on the rotor which is detected as it passes the optical sensor or in some other known way. The position detector determines the rate of rotation of the rotor and the current position of the protrusions on the rotor and this information is used to control the current supplied to each of the windings such that they are at a preferred level compared to the position of the protrusions on the rotor and act to efficiently pull the rotor around. In this way, one can ensure that the magnetic field pulling one portion of the rotor does not act against the magnetic field pulling another portion of the rotor.

In this embodiment the protrusions 62 on the rotor are aligned with the longitudinal axis of the rotor, which means that when a protrusion is aligned with a winding, it is aligned along the entire length of at least one stator component. This can lead to fluctuations in the torque generated. This can be addressed by individual control of the current supplied to the windings, such control acting to control these torque fluctuations.

Figure 8:
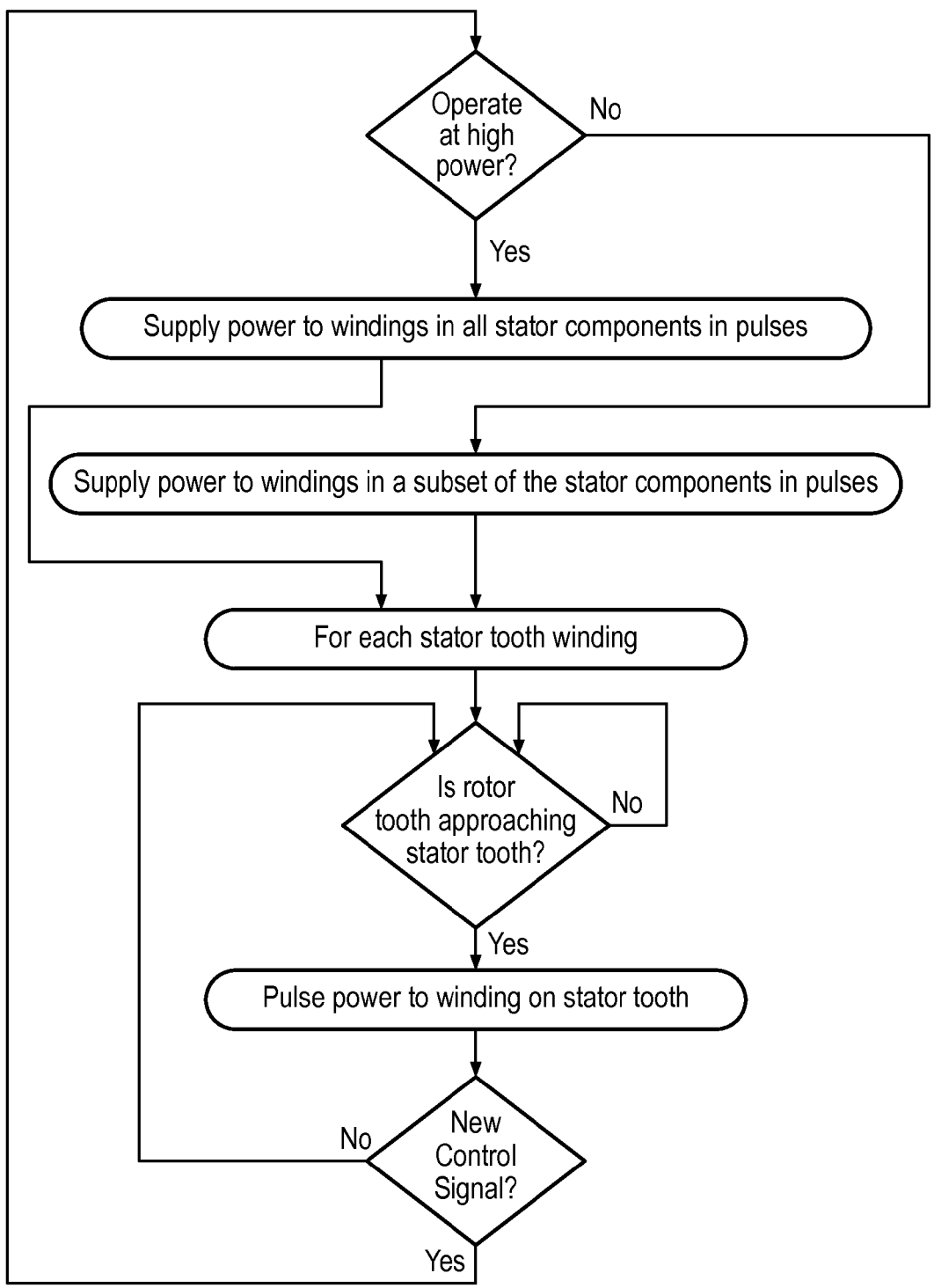
FIG. 8 shows steps in a method according to an embodiment of the present invention.

FIG. 8 shows a flow diagram illustrating steps in a method according to an embodiment of the present invention. The initial step is to determine whether or not the electric motor is required operate at a high power. If it is then power is supplied to all the windings in all of the stator components. If it is not then power is supplied to the windings in a sub-set of the stator components. In the case of a switched reluctance motor then the power is supplied in pulses whereas in an induction motor the power is generally supplied as a sinusoidal wave.

In the case of an induction motor the number of stator components that are powered determines the power of operation of the motor. The motor operating at high efficiency as the windings that are powered are fully powered.

In the case of a switched reluctance motor then there is an additional control of the power that is sent to the individual windings on the stator teeth of each stator component. Thus, for each stator tooth winding the relative position of the rotor is determined with respect to the stator and where the rotor tooth is approaching the stator tooth a pulse of power is supplied to the winding on this stator tooth to attract the rotor.

It is then determined if there is a new control signal. If not this loop is performed again whereas if there is a new control signal it is determined if the motor should still be operating at high power or if it should be operating at lower power. If so the power that is supplied to the different stator components is changed in dependence on the answer to this question. In this way, in a switched reluctance motor the pulsing of the power is controlled to the individual windings which allows for it to operate efficiency and ripples in the torque to be reduced even where the teeth on the rotor are straight rather than being offset to the longitudinal axis in the form of a squirrel cage.

It should be noted although an example was given here of individual control of the windings they may in fact be controlled in sets of windings. This may be appropriate where for example, the number of teeth on the rotor and stator are such that alternate windings are at a same relative position to the rotor teeth and should be controlled in a similar manner.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

The invention claimed is:

1. An electric motor stator comprising:
   first and second stator components arranged adjacent to each other along a longitudinal central axis of the stator, each stator component having a substantially hollow cylindrical form for receiving a rotor such that said rotor can rotate about the longitudinal central axis of the stator, the first and second stator components each comprising at least two protrusions arranged at different circumferential points on an inner surface of the respective stator component,
   wherein the first and second stator components are arranged such that the protrusions on the first stator component are rotationally offset with respect to the protrusions on the second stator component, such that when each of the protrusions have a winding mounted thereon, a portion of a winding on the first stator component extends into a gap between windings on the second stator component.

2. An electric motor stator according to claim 1, comprising one or more windings mounted to one or more of said protrusions.

3. An electric motor stator according to claim 2, wherein each of said first and second stator components comprises at least twelve said protrusions, each comprising a said winding.

4. An electric motor stator according to claim 1, wherein each of said windings of each of said at least two stator components are independently controllable.

5. An electric motor stator according to claim 4, wherein said windings on one of said at least two stator components are powerable independently to said windings on said adjacently mounted stator component.

6. An electric motor comprising:
   a rotor; and
   the electric motor stator according to claim 1;
   said rotor being mounted within said at least two stator components on a rotational mounting such that said rotor can rotate about a longitudinal central axis with respect to said stator.

7. An electric motor controller for controlling an electric motor according to claim 6, comprising:
   control circuitry to generate control signals to control power supplied to said windings on each of said at least two stator components, such that power can be controlled to each of said at least two stator components independently of each other.

8. An electric motor controller according to claim 7, wherein said control circuitry is capable of independently controlling said power supplied to each of said windings on each of said at least two stator components in order to control output torque generated by said motor.

9. An electric motor controller according to claim 7, wherein said control circuitry is capable of controlling said power supplied to said windings on each of said at least two stator components such that said power supplied to said windings on one of said at least two stator components is controlled independently to said power supplied to windings on said adjacently mounted stator component, and said power supplied to each winding on each of said at least two stator components is controlled independently compared to an adjacent winding.

10. An electric motor controller according to claim 8, wherein said control circuitry comprises rotational position detection circuitry for detecting a current position of said rotor relative to each of said at least two stator components, said control circuitry being configured to control said power supplied to said windings in dependence upon said detected current position.

* * * * *